United States Patent
Takahashi et al.

(10) Patent No.: US 10,960,680 B2
(45) Date of Patent: Mar. 30, 2021

(54) PRINTING DEVICE AND PRINTING METHOD

(71) Applicants: Hiroaki Takahashi, Kanagawa (JP); Kiminori Masuda, Tokyo (JP); Mio Akima, Tokyo (JP)

(72) Inventors: Hiroaki Takahashi, Kanagawa (JP); Kiminori Masuda, Tokyo (JP); Mio Akima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/699,252

(22) Filed: Nov. 29, 2019

(65) Prior Publication Data
US 2020/0171839 A1 Jun. 4, 2020

(30) Foreign Application Priority Data
Nov. 29, 2018 (JP) .................................. 2018-223698

(51) Int. Cl.
*B41J 2/21* (2006.01)
*B41J 11/00* (2006.01)
(Continued)

(52) U.S. Cl.
CPC ......... *B41J 2/2114* (2013.01); *B41J 2/17503* (2013.01); *B41J 11/002* (2013.01); *C09D 11/30* (2013.01)

(58) Field of Classification Search
CPC ........ B41J 2/2114; B41J 11/002; C09D 11/30
See application file for complete search history.

(56) References Cited

U.S. PATENT DOCUMENTS

2011/0128336 A1\* 6/2011 Onishi .................. B41J 11/002 347/102
2013/0335495 A1\* 12/2013 Umebayashi .......... C09D 11/40 347/102

(Continued)

FOREIGN PATENT DOCUMENTS

JP 2004-261976 9/2004
JP 2009-208348 9/2009
(Continued)

OTHER PUBLICATIONS

U.S. Appl. No. 16/412,481, filed May 15, 2019, Hiroaki Takahashi, et al.
(Continued)

*Primary Examiner* — Matthew Luu
*Assistant Examiner* — Kendrick X Liu
(74) *Attorney, Agent, or Firm* — Oblon, McClelland, Maier & Neustadt, L.L.P.

(57) ABSTRACT

A printing device includes an ink container, an ink in the ink container, the ink containing an aqueous clear ink and an aqueous color ink and a heating device configured to heat a substrate, wherein the relationship is satisfied, $|S_{CL}-S_C| \leq 5$ mN/m, where $S_{CL}$ represents the surface tension of the aqueous clear ink and $S_C$ represents the surface tension of the aqueous color ink, wherein the printing device has a low gloss printing and a high gloss printing mode, wherein the heating device heats the substrate while satisfying the relationship: Tlow>Thigh, where Tlow represents the temperature of the substrate in a low gloss printing region in which the aqueous clear ink is printed in the low printing mode and Thigh represents the temperature of the substrate in a high gloss printing region in which the aqueous clear ink is printed in the high printing mode.

13 Claims, 2 Drawing Sheets

(51) Int. Cl.
*C09D 11/30* (2014.01)
*B41J 2/175* (2006.01)

(56) References Cited

U.S. PATENT DOCUMENTS

| | | |
|---|---|---|
| 2016/0096379 A1* | 4/2016 | Wetjens ............... B41J 11/002 347/16 |
| 2017/0158892 A1 | 6/2017 | Takahashi et al. |
| 2017/0174919 A1 | 6/2017 | Kido et al. |
| 2017/0335123 A1 | 11/2017 | Nakamura et al. |
| 2018/0170061 A1 | 6/2018 | Nakamura et al. |
| 2018/0208783 A1 | 7/2018 | Takahashi et al. |
| 2019/0270903 A1 | 9/2019 | Kohzuki et al. |

FOREIGN PATENT DOCUMENTS

| | | |
|---|---|---|
| JP | 2010-173287 | 8/2010 |
| JP | 2012-232529 | 11/2012 |
| JP | 2015-003397 | 1/2015 |

OTHER PUBLICATIONS

U.S. Appl. No. 16/426,481, filed May 30, 2019, Kiminori Masuda, et al.

* cited by examiner

PRINTING DEVICE AND PRINTING METHOD

This patent application is based on and claims priority pursuant to 35 U.S.C. § 119 to Japanese Patent Application Nos. 2018-223698 filed on Nov. 29, 2018, in the Japan Patent Office, the entire disclosure of which is hereby incorporated by reference herein.

BACKGROUND

Technical Field

The present disclosure relates to a printing device and a printing method.

Description of the Related Art

For industrial use in advertisement and signboards and packaging material for food, beverage, and daily use articles, etc., for example, non-permeable recording media such as plastic film are used in order to enhance durability for light, water, abrasion, etc. Naturally, inks for such non-permeable recording media have been developed.

As such inks, for example, a solvent-based ink using an organic solvent as a solvent and an ultraviolet-curable ink mainly constituted of a polymerizable monomer have been widely used. However, the solvent-based ink causes a concern about an adverse impact on the environment due to evaporation of the organic solvent. The ultraviolet curing ink has a limited choice of polymerizable monomers in terms of safety in some cases.

For this reason, ink sets including aqueous ink capable of direct recording on non-permeable recording media have been proposed.

Also, an inkjet recording device having a feature capable of controlling gloss has been developed.

For example, a liquid jetting device has been proposed, which includes a liquid jetting head capable of jetting an ink containing thermoplastic resin particles from a nozzle to a target and a heating device to heat ink droplets landed on the target, wherein the heating device heats the ink droplets at the filming control temperature according to the minimal film-forming temperature below which the surface of the ink droplets is not filmed to control the degree of the filming of the surface of the ink droplets.

SUMMARY

According to embodiments of the present disclosure, provided is a printing device which includes an ink container, an ink accommodated in the ink container, the ink containing an aqueous clear ink containing a resin and water and an aqueous color ink containing a resin, a coloring material, and water, and a heating device configured to heat a substrate, wherein the following relationship is satisfied, $|S_{CL}-S_C| \leq 5$ mN/m, where $S_{CL}$ represents a surface tension of the aqueous clear ink and $S_C$ represents a surface tension of the aqueous color ink, wherein the printing device has a low gloss printing mode in which low gloss is imparted and a high gloss printing mode in which high gloss is imparted, wherein the heating device heats the substrate while satisfying the following relationship: Tlow>Thigh, where Tlow represents a temperature in Celcius of the substrate in a low gloss printing region in which the aqueous clear ink is printed in the low printing mode and Thigh represents a temperature in Celcius of the substrate in a high gloss printing region in which the aqueous clear ink is printed in the high printing mode.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
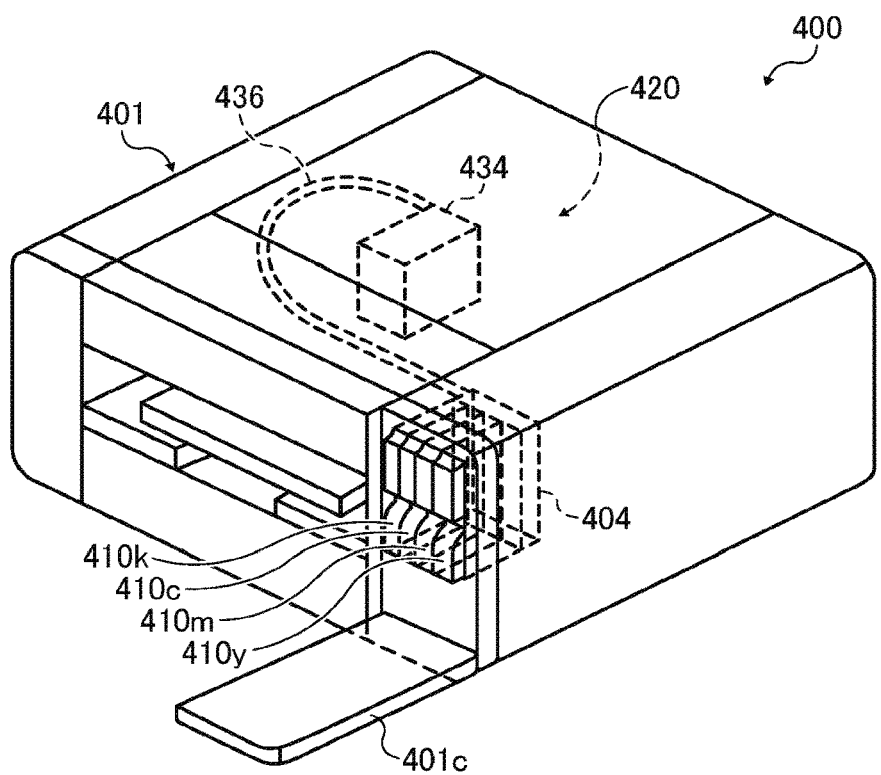
FIG. 1 is a schematic diagram illustrating an example of the image forming device executing the image forming method according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a printing device is provided which can control both low gloss printing and high gloss printing without causing bleeding to a print image.

Printing Device and Printing Method

The printing device according to the present disclosure includes an ink container, an ink accommodated in the ink container, the ink containing an aqueous clear ink containing a resin and water and an aqueous color ink containing a resin, a coloring material, and water, a heating device configured to heat a substrate, and other optional devices, wherein the following relationship is satisfied, $|S_{CL}-S_C|\leq 5$ mN/m, where $S_{CL}$ represents a surface tension of the aqueous clear ink and $S_C$ represents a surface tension of the aqueous color ink, wherein the printing device has a low gloss printing mode in which low gloss is imparted and a high gloss printing mode in which high gloss is imparted, wherein the following relationship is satisfied, Tlow>Thigh, where Tlow represents a temperature in Celcius of the substrate in a low gloss printing region in which the aqueous clear ink is printed in the low printing mode and Thigh represents a temperature in Celcius of the substrate in a high gloss printing region in which the aqueous clear ink is printed in the high printing mode.

In addition, the printing device according to the present disclosure includes an ink container, an ink accommodated in the ink container, the ink containing an aqueous clear ink containing a resin and water and an aqueous color ink containing a resin, a coloring material, and water, a heating device configured to heat a substrate, and other optional devices, wherein the following relationship is satisfied, $|S_{CL}-S_C|\leq 5$ mN/m, where $S_{CL}$ represents a surface tension of the aqueous clear ink and $S_C$ represents a surface tension of the aqueous color ink, wherein the printing device has a low gloss printing mode in which low gloss is imparted and a high gloss printing mode in which high gloss is imparted, wherein the following relationship is satisfied, HTlow>HThigh, where HTlow represents a temperature in Celcius of the heating device in the low gloss printing mode and HThigh represents a temperature in Celcius of the heating device in the high gloss printing mode.

The printing method according to the present disclosure includes applying an ink to a substrate, heating the substrate, and other optional processes, wherein the ink contains an aqueous clear ink containing a resin and water and an aqueous color ink containing a resin, a coloring material, and water, wherein the following relationship is satisfied, $|S_{CL}-S_{CS}|\leq 5$ mN/m, where $S_{CL}$ represents a surface tension of the aqueous clear ink and $S_C$ represents a surface tension of the aqueous color ink, wherein the printing method has a low gloss printing mode in which low gloss is imparted and a high gloss printing mode in which high gloss is imparted, wherein the following relationship is satisfied, Tlow>Thigh, where Tlow represents a temperature in Celcius of the substrate in a low gloss printing region in which the aqueous clear ink is printed in the low printing mode and Thigh represents a temperature in Celcius of the substrate in a high gloss printing region in which the aqueous clear ink is printed in the high printing mode.

For a typical recording device using a clear ink (UV clear ink) that cures upon an application of ultraviolet rays, a gloss control method has been proposed which controls the irradiation amount of ultraviolet rays to select matte or gloss printing.

However, UV clear ink has a problem of having a strong odor. Since the odor remains in the printed matter, it is unsuitable for the printed matter for indoor use. For this reason, the place of installation of the printing device also requires an environment capable of exhausting air, which limits the selection of the place of installation. In addition, the UV clear ink requires an ultraviolet ray irradiation device, which increases the size of the device and the cost.

The printing device and the printing method of the present disclosure are based on the knowledge that although, in a typical technology, the degree of filming of the surface of droplets of color ink containing a coloring material is controlled by heating at film-forming control temperatures according to the minimal film-forming temperature at which film formation of the ink droplet starts in order to control the gloss degree, the color ink containing a coloring material does not make a large gloss difference in comparison with a clear ink containing no coloring material, which makes it impossible to clearly distinguish matte printing from gloss printing.

The printing device and the printing method of the present disclosure use an aqueous clear ink containing water and a resin, and control both high gloss printing and low gloss printing by the control of the heating temperature. In the high gloss printing mode, high gloss is imparted so that the surface of printed matter is smooth with high gloss. In the low gloss printing mode, low gloss is imparted so that the surface of printed matter has fine roughness with low gloss. The high gloss printing mode is also referred to as "gloss gloss printing mode" and the low gloss printing mode is also referred to as "matte gloss printing mode". To impart low gloss to printed matter (i.e., printing layer), the temperature at printing is higher than that in the high gloss printing. Since the temperature at the time of printing is high, the wet-spreading of dots of an aqueous clear ink containing a resin is reduced, the coalescence of adjacent dots is also reduced, and dots having dot balls having a high height (pile height) are formed. These dots form surface irregularities and impart low gloss.

To impart high gloss, printing is conducted at a temperature lower than that in the low gloss printing. Since the temperature at the time of printing is low, dots of an aqueous clear ink containing a resin wet-spread and coalescence of adjacent dots is also promoted, so that smooth surfaces are formed, thereby imparting high gloss.

Therefore, the printing device of the present disclosure has low gloss printing mode to impart low gloss and high gloss printing mode to impart high gloss using an aqueous clear ink containing a resin and water and is capable of controlling both low gloss printing and high gloss printing when the following relationship is satisfied as heated by the heating device: Tlow>Thigh, where Tlow represents the temperature in Celcius of the substrate in a low gloss printing region in which the aqueous clear ink is printed in the low printing mode and Thigh represents the temperature in Celcius of the substrate in a high gloss printing region in which the aqueous clear ink is printed in the high printing mode or when the following relationship is satisfied: HTlow>HThigh, where HTlow represents the temperature in Celcius of the heating device in the low gloss printing mode and HThigh represents the temperature in Celcius of the heating device in the high gloss printing mode. According to the present disclosure, printed matter with low gloss and/or high gloss can be provided without a particular limitation to the subject to which the aqueous clear ink is applied. As the subject, an example is the substrate to which the aqueous clear ink is applied.

The heating device of the printing device of the present disclosure heats the substrate while satisfying the following relationship: Tlow>Thigh, preferably Tlow−Thigh≥10 degrees C. and more preferably Tlow−Thigh≥20 degrees C.

Therefore, in the low gloss printing mode, the heating temperature is raised to reduce wet-spreading of dots, thereby forming dots having a high pile height to form a surface having large roughness. In the high gloss printing mode, the heating temperature is lowered to promote the wet-spreading of dots, which promotes coalescence of adjacent dots, resulting in formation of a smooth surface.

The temperature Tlow of the substrate in the low gloss printing region in which the aqueous clear ink is printed in the low gloss printing mode is preferably 50 degrees C. or more and more preferably from 50 to 80 degrees C.

The temperature Thigh in Celcius of the substrate in the high gloss printing region in which the aqueous clear ink is printed in the high gloss printing mode is preferably 70 degrees C. or less and more preferably 60 degrees C. or less.

Within this temperature range, a large change in gloss degree can be demonstrated in each printing mode using the aqueous clear ink.

The temperature of the substrate of the printing portion is measured by, for example, a method of directly measuring the recording medium by a thermocouple mounted onto the recording medium as the substrate, a method of measuring the temperature of the heater that heats the recording medium, and a method of measuring the ambient temperature of the recording medium in a non-contact manner by a radiation thermometer, etc., to determine the ambient temperature as the temperature of the recording medium.

In the present disclosure, when the print ratio of a low gloss print image printed in the low gloss printing mode is Dlow and the print ratio of a high gloss print image printed in the high gloss printing mode is Dhigh, the following relationship is preferably satisfied: Dhigh>Dlow and more preferably Dhigh−Dlow>10 percent.

Since a smooth surface is easily formed when the print ratio is high, an image having a high print ratio is produced in the high gloss printing mode. In the low gloss printing mode, when the print ratio is high, adjacent dots are coalesced, thereby making it difficult to form a rough surface. Therefore, the print ratio is low in the low gloss printing mode.

The print ratio means the following:

$$\text{Print ratio(percent)} = \text{number of clear ink print dots}/(\text{vertical resolution} \times \text{horizontal resolution}) \times 100$$

In this formula, "the number of clear ink printing dots" means the number of dots actually printed with clear ink per unit area, and "vertical resolution" and "horizontal resolution" are resolutions per unit area. When clear ink is disposed at the same dot position in an overlapping manner for printing, "the number of clear ink printing dots" represents the total number of dots per unit area actually used for printing with clear ink.

The print ratio 100 percent means the maximum ink weight of a single color with respect to a pixel.

Ink Container

The ink container accommodates ink.

The ink container is not particularly limited as long as it is a member capable of accommodating ink. For example, it includes an ink storage container and an ink tank. The ink container accommodates the ink and includes other optional suitably-selected members.

There is no specific limit to the ink container. It is possible to select any form, any structure, any size, and any material. For example, a container having at least an ink bag formed of aluminum laminate film, a resin film, etc. can be suitably used.

Examples of the ink tank include a main tank and a sub tank.

Discharging Head

The printing device of the present disclosure may include a discharging head. The discharging head discharges ink to form a printing layer on the substrate mentioned above where the ink is attached.

The discharging head includes a nozzle plate, a pressurizing chamber, and a stimulus generating device.

Nozzle Plate

The nozzle plate includes a nozzle substrate and an ink repellent film on the nozzle substrate.

Pressurizing Chamber

Each of the pressurizing chambers, which is individually disposed corresponding to a nozzle orifice provided to the nozzle plate is an individual flow path communicating with the nozzle orifice. The pressurizing chamber is also referred to as an ink flow path, a pressurizing liquid chamber, a pressure chamber, a discharging chamber, a liquid chamber, etc.

Stimulus Generating Device

The stimulus generating device generates a stimulus to be applied to the ink.

The stimulus generated by the stimulus generating device has no specific limit and can be suitably selected to a particular application. For example, heat (temperature), pressure, vibration, and light can be suitably used as the stimulus. These can be used alone or in combination. Of these, heat and pressure are preferable.

The stimulus generating device includes, for example, a heating device (heater), a pressurizing device, a piezoelectric element, a vibrator, an ultrasonic oscillator, and light.

Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

When the stimulus is "heat", thermal energy corresponding to a recording signal is applied to the ink in the ink discharging head using, for example, a thermal head. For example, a method can be utilized which generates bubbles in the ink by the heat energy and discharges the ink as liquid droplets from the nozzle orifice of the nozzle plate due to the pressure of the bubbles.

When the stimulus is "pressure", for example, the piezoelectric element is bent by applying a voltage to the piezoelectric element bonded at a position called the pressure chamber in the ink flow path in the ink discharging head. As a result, the volume of the pressure chamber is contracted, and the ink may be discharged as droplets from the nozzle orifice of the ink discharging head.

Of these, a piezo method of applying a voltage to a piezoelectric element to jet the ink is preferable.

Heating Device

The heating device heats the substrate.

The heating device heats and dries the printing surface and the back surface of the recording medium as the substrate. Examples of the heating device include an infrared heater, a hot air heater, and a heating roller. These can be used alone or in combination.

The method of drying the recording medium as the substrate is not particularly limited and can be suitably selected to suit to a particular application. Examples of the method include, but are not limited to, a method of drying the recording medium to which the ink is applied by bringing a heated fluid such as warm air as a drying device into contact with the recording medium, a method of transferring heat from a heating member to an ink applied recording medium by contact, and a method of heating the recording medium to which the ink is applied with energy rays such as infrared rays or far infrared rays.

The heating can be conducted before, during, and/or after printing.

Heating before and/or in the middle of printing makes it possible to print on a heated medium and the printed matter can be dried by heating after printing.

The heating time is not particularly limited as long as the surface temperature of the recording medium can be controlled to a desired temperature and can be suitably selected to suit to a particular application.

The heating time is preferably controlled by the control of the conveying speed of the recording medium as the substrate.

As the temperature HT in Celcius of the heating device, as described above, the temperature HTlow in Celcius of the heating device when the aqueous clear ink is printed on the substrate in the low gloss printing mode and the temperature HThigh of the heating device when the aqueous clear ink is printed on the substrate in the high gloss printing mode satisfy the following relationship: HTlow>HThigh.

As the temperature HT in Celcius of the heating device, the following relationship is satisfied: HTlow>HThigh and preferably the following relationship is HTlow−HThigh≥10 degrees C. There is no specific limitation to the temperature HT in Celcius of the heating device and can be suitably selected to suit to a particular application. For example, the preset temperature of the heating device can be used as the temperature HT in Celcius of the heating device.

Ink

As the ink, aqueous clear ink and aqueous color ink are used.

The clear ink means a colorless and transparent ink that does not substantially contain a coloring material and the color ink means an ink containing a coloring material such as a pigment or a dye.

The aqueous clear ink and the aqueous color ink mean a clear ink and a color ink containing water as a solvent, respectively, and may furthermore optionally contain an organic solvent.

The aqueous clear ink and the aqueous color ink contain water and a resin, preferably a surfactant, and other optional components.

Water

There is no specific limitation to the water and it can be suitably selected to suit to a particular application. For example, pure water such as deionized water, ultrafiltered water, reverse osmosis water, and distilled water and ultra pure water are suitable. These can be used alone or in combination.

The proportion of the water is preferably from 15 to 60 percent by mass to the total amount of the aqueous clear ink. When the proportion is 15 percent by mass or more, viscosity can be prevented from increasing, and discharging stability can be improved. On the other hand, when the proportion is 60 percent by mass or less, the wettability to a non-permeable recording medium becomes suitable, and the image quality can be improved.

Resin

The resin has no particular limit and can be suitably selected to suit to a particular application.

Specific examples include, but are not limited to, polyurethane resins, polyester resins, acrylic resins, vinyl acetate resins, styrene resins, butadiene resins, styrene-butadiene resins, vinylchloride resins, acrylic styrene resins, and acrylic silicone resins.

When manufacturing the ink, it is preferable to add the resin as resin particles composed of these resins. The resin particle may be added to the ink in a form of a resin emulsion in which the resin is dispersed in water as a dispersion medium. The resin particle can be synthesized or is available on the market. These resin particles can be used alone or in combination. Of these, polyurethane resins are preferable. By adding a polyurethane resin, when an ink film is formed using a clear ink, the coating film itself becomes robust. As a consequence, it is easy to reduce breakage of the film inside, which leads to a color change in the abraded portion and the change in the surface state of the film, resulting in color change in the abraded portion.

Polyurethane Resin

Examples of the polyurethane resin include, but are not limited to, polyether-based polyurethane resin, polycarbonate-based polyurethane resin, and polyester-based polyurethane resin are preferable.

There is no specific limit to the polyurethane resin and it can be suitably selected to suit to a particular application. For example, polyurethane resin, etc. are suitably used, which are obtained by causing polyol to react with polyisocyanate.

Polyol

Examples of the polyol include, but are not limited to, polyether polyols, polycarbonate polyols, and polyester polyols. These can be used alone or in combination.

Polyether Polyol

As the polyether polyol, for example, usable is an article obtained by addition polymerization of an alkyleneoxide to a starting material, which is at least one type of compounds having two or more active hydrogen atoms.

Specific examples of the compound having two or more active hydrogen atoms include, but are not limited to, ethylene glycol, diethylene glycol, triethylene glycol, propylene glycol, trimethylene glycol, 1,3-butanediol, 1,4-butanediol, and 1,6-hexane diol, glycerin, trimethylolethane, and trimethylolpropane. These can be used alone or in combination.

Specific examples of the alkylene oxide include, but are not limited to, ethylene oxide, propylene oxide, butylene oxide, styrene oxide, epichlorohydrin, and tetrahydrofuran. These can be used alone or in combination.

The polyether polyol is not particularly limited and can be suitably selected to suit to a particular application. It is preferable to use polyoxytetra methylene glycol or polyoxypropylene glycol in order to obtain a binder for ink having extremely excellent scratch resistance. These can be used alone or in combination.

Polycarbonate Polyol

As polycarbonate polyol that can be used to manufacture the polyurethane resin, for example, a product obtained by causing a carboxylic acid ester to react with a polyol or causing a phosgene to react with bisphenol A, etc. These can be used alone or in combination.

Specific examples of the carboxylic acid ester include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, relatively low molecular weight dihydroxy compounds such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexane dimethanol, hydroquinone, resorcinol, bisphenol-A, bisphenol F, and 4,4'-biphenol; polyether polyol such as polyethylene glycol, polypropylene glycol, and polyoxytetramethylene glycol; and polyester such as polyhexamethylene adipate, polyhexamethylene succinate, and caprolactone. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester thereof. These can be used alone or in combination.

Specific examples of the polyol having a low molecular weight include, but are not limited to, ethylene glycol and propylene glycol. These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. These can be used alone or in combination. Of these, alicyclic diisocyanate is preferably used in terms of weatherability.

Furthermore, it is preferable to add at least one type of alicyclic diisocyanate, thereby easily acquiring a desired film robustness and scratch resistance.

Specific examples of the alicyclic diisocyanate include, but are not limited to, isophorone diisocyanate and dicyclohexylmethane diisocyanate.

The proportion of the alicyclic diisocyanate is preferably 60 percent by mass or greater to the total content of the isocyanate compound.

Method of Manufacturing Polyurethane Resin

The polyurethane resin has no particular limit and can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrrolidone, and N-ethyl pyrrolidone. These can be used alone or in combination.

Polyamines or other compounds having an active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines such as hydradine, N,N'-dimethyl hydrazine, and 1,6-hexamethylene bis hydrazine, and dihydrazides such as succinic acid dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of ink.

As the polyurethane resin, polycarbonate-based polyurethane resins are preferable in terms of water resistance, heat resistance, abrasion resistance, weathering resistance, and scratch resistance of images due to high agglomeration power of carbonate groups. Ink obtained by using polycarbonate-based polyurethane resin is suitable for recorded matter for use in severe conditions like outdoor use.

As the polyurethane resin, products available on the market can be used. Specific examples include, but are not limited to, UCOAT UX-485 (polycarbonate-based polyurethane resin), UCOAT UWS-145 (polyester-based polyurethane resin), PERMARIN UA-368T (polycarbonate-based polyurethane resin), and PERMARIN UA-200 (polyether-based polyurethane resin) (all manufactured by Sanyo Chemical Industries, Ltd.). These can be used alone or in combination.

The proportion of the resin in the clear ink is preferably from 8 percent by mass or more and more preferably from 8 to 25 percent by mass. When the resin proportion is 8 percent by mass or more, low gloss and high gloss can be controlled with a small amount of clear ink. When the proportion of the resin exceeds 25 percent by mass, the discharging stability of the ink may be lowered.

Low gloss is demonstrated by forming isolated dots having high dot ball height (pile height) to impart roughness to the surface.

When the proportion of the resin in the clear ink is large, dots having a high pile height are easily formed, which is preferable in terms of imparting low gloss.

Conversely, high gloss is obtained by filling surface irregularities with clear ink, thereby forming a smooth surface. In order to fill the surface irregularities with the clear ink, it is preferable that the proportion of the resin in the clear ink be large because the surface irregularities can be filled with a small amount of clear ink, thereby easily imparting high gloss.

Surfactant

The clear ink preferably contains a surfactant.

When a surfactant is added to the ink, the surface tension is lowered and the ink droplets quickly permeate a recording medium such as paper after the ink droplets have landed thereon, so that feathering and color bleed are reduced.

urfactants are classified into nonionicity, anionicity, and amphotericity according to the polarity of the hydrophilic group.

Moreover, it is classified into a fluorine type, a silicone type, an acetylene type, etc., according to the structure of a hydrophobic group.

In the present disclosure, a fluorochemical surfactant is mainly used, but a silicone-based surfactant or an acetylene-based surfactant may be used in combination.

The proportion of the surfactant is preferably not greater than 2.00 percent by mass, more preferably from 0.05 to 2.00 percent by mass, and furthermore preferably from 0.10 to 2.00 percent by mass. When the proportion of the surfactant is 2.00 percent by mass or less, a large reduction in gloss can be obtained in the low gloss printing mode.

As the surfactant, it is possible to use any of silicone-based surfactants, fluorochemical surfactants, amphoteric surfactants, nonionic surfactants, or anionic surfactants.

The silicone-based surfactant has no particular limit and can be suitably selected to suit to a particular application. Of these, surfactants not soluble in a high pH environment are preferable. Examples of the silicone-based surfactants include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, silicone-based surfactants having a polyoxyethylene group or a polyoxyethylene polyoxypropylene group as a modification group are particularly preferable because such an aqueous surfactant demonstrates good property. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

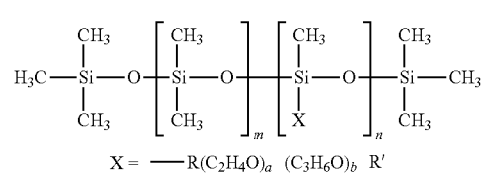

X = ——R(C$_2$H$_4$O)$_a$ (C$_3$H$_6$O)$_b$ R'

In Chemical formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not easily foam and the fluorosurfactant represented by the following Chemical formula F-1 or Chemical formula F-2 is preferable.

Chemical formula F-1

In the compound represented by Chemical formula F-1, m is preferably 0 or an integer of from 1 to 10 and n is preferably 0 or an integer of from 1 to 40.

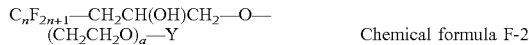

Chemical formula F-2

In the compound represented by the chemical formula F-2, Y represents H or $C_mF_{2m+1}$, where m represents an integer of from 1 to 6, or $CH_2CH(OH)CH_2—C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

As the fluorochemical surfactant, products available on the market may be used.

Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

Organic Solvent

The clear ink may contain an organic solvent. The organic solvent has no specific limit and is suitably selected to suit to a particular application. For example, water-soluble organic solvents are usable. Note that being water-soluble means, for example, 5 g or more of an organic solvent is dissolved in 100 g of water at 25 degrees C.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, 3-methoxy-3-methyl butanol, tri ethylene glycol, polyethylene glycol, polypropylene glycol, 1,5-pentanediol, 2-methyl-2,4-pentane diol, 1,6-hexanediol, glycerin, 1,2,6-hexanetriol, 2-ethyl-1,3-hexanediol, ethyl-1,2,4-butane triol, 1,2,3-butanetriol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, propylene glycol monoethylether, and dipropylene glycol monomethylether; polyol arylethers such as ethylene glycol monophenylether and ethylene glycol monobenzyleether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methylformamide, and N,N-dimethylformamide; amines such as monoethanolamine, diethanolamine, and triethylamine; sulfur-containing compounds such as dimethyl sulfoxide, sulfolane, and thiodiethanol; propylene carbonate, and ethylene carbonate. These can be used alone or in combination.

The proportion of the organic solvent in the aqueous clear ink has no particular limit and can be suitably selected to suit to a particular application.

In terms of drying property and discharging reliability of ink, the proportion is preferably from 10 to 60 percent by mass and more preferably from 20 to 60 percent by mass.

The aqueous clear ink may furthermore optionally contain, for example, a defoaming agent, a preservatives and fungicides, a corrosion inhibitor, and a pH regulator.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

The aqueous color ink further contains a coloring material.

Coloring Material

The coloring material has no specific limit and is suitably selected to suit to a particular application. For example, pigments and dyes are usable.

As the pigment, an inorganic pigment or an organic pigment can be used. Examples include, but are not limited to, black pigments, yellow pigments, magenta pigments, cyan pigments, white pigments, and glossy pigments such as gold pigments and silver pigments.

As the inorganic pigments, titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use, for example, azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used.

Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, and 254; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, and 15:3 (Phthalocyanine Blue), 16, 17:1, 56, 60, and 63; C.I. Pigment Green 1, 4, 7, 8, 10, 17, 18, and 36.

The proportion of the coloring material in the color ink is not particularly limited and can be suitably selected to suit to a particular application. For example, it is preferably from 0.1 to 10 percent by mass and more preferably from 1 to 10 percent by mass. When the proportion of the color material in the color ink is 0.1 to 10 percent by mass, the image density can be improved, and good fixing properties to the substrate and ink discharging stability can be obtained.

When a pigment is used as the coloring material, to disperse the pigment in an ink, for example, a method of preparing a self-dispersible pigment by introducing a hydrophilic functional group into the pigment, a method of coating the surface of the pigment with resin, and a method of using a surfactant or a large molecular weight dispersant can be used.

To prepare a self-dispersible pigment by introducing a hydrophilic functional group into a pigment, it is possible to use, for example, a self-dispersion pigment, etc. in which a functional group such as sulfone group and carboxyl group is added to the pigment (e.g., carbon) to be dispersible in water.

To disperse a pigment coated with a resin, for example, a pigment encapsulated into a microcapsule is used to allow the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

As the method of using a surfactant or a large molecular weight dispersant, for example, a method of using a known surfactant or a known dispersant having a large molecular weight can be used to disperse the pigment.

As the surfactants, for example, anionic surfactants, cationic surfactants, nonionic surfactants, and ampholytic surfactants can be suitably used.

Specific examples of the dispersant having a large molecular weight include, but are not limited to, polyacrylic acids, polymethacrylic acids, copolymers of acrylic acid and acrylic nitrile, copolymers of vinyl acetate and alkyl ester, copolymers of acrylic acid and acrylic acid alkyl ester, copolymers of styrene and acrylic acid, copolymers of styrene and methacrylic acid, copolymers of styrene, acrylic acid, and acrylic acid alkyl ester, copolymers of styrene, methacrylic acid, and acrylic acid alkyl ester, copolymers of styrene, α-methyl styrene, and acrylic acid, copolymers of styrene, α-methyl styrene, acrylic acid, and acrylic acid alkyl ester, copolymers of styrene and maleic acid, copolymers of vinyl naphthalene and maleic acid, copolymers of vinyl acetate and ethylene, copolymers of vinyl acetate and vinyl ethylene aliphatic acid, copolymers of vinyl acetate and maleic ester, copolymers of vinyl acetate and crotonic acid, copolymers of vinyl acetate and acrylic acid, and modified polyurethanes.

In addition, a naphthalenesulfonic acid Na formalin condensate or the like can also be used as dispersant.

These can be used alone or in combination.

A coloring material, water, an organic solvent, and other materials, which are added to the ink, can be mixed to obtain the ink. In addition, it is preferable to mix water, a pigment, and optionally a dispersant to obtain a pigment dispersant, which is added to obtain the ink.

The pigment dispersion is obtained by mixing and dispersing water, a pigment, a pigment dispersant, and other optional components by a disperser and controlling the particle diameter.

The particle diameter of the pigment is not particularly limited. When the particle diameter at the maximum frequency in the maximum number conversion is from 20 to 150 nm, the dispersion stability of the pigment is improved and the image quality such as dispersion stability and image density is also improved, which is preferable. The particle diameter of the pigment can be measured by using a particle size analyzer (Microtrac MODEL UPA 9340, manufactured by Nikkiso Co., Ltd.).

The proportion of the pigment in the pigment dispersion is not particularly limited and can be suitably selected to suit to a particular application. For example, it is preferably from 0.1 to 50 percent by mass and more preferably from 0.1 to 30 percent by mass. It is preferable that the pigment dispersion be filtered with a filter, a centrifuge, etc. to remove coarse particles followed by degassing.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to be not lower than 7. Specific examples include, but are not limited to, amines such as diethanol amine and triethanol amine.

Ink Properties

Surface Tension

The surface tension $S_{CL}$ of the aqueous clear ink and the surface tension $S_C$ of the aqueous color ink satisfy the following relationship: $|S_{CL}-S_C| \leq 5$ mN/m. Surface tension of the ink can be measured at 25 degrees C. by using, for example, a fully-automatic surface tensiometer (CBVP-Z, manufactured by Kyowa Interface Science Co., Ltd.).

When the surface tension $S_{CL}$ of the aqueous clear ink and the surface tension $S_C$ of the aqueous color ink satisfy $|S_{CL}-S_C|>5$ mN/m and the clear ink is printed on the color ink, bleeding occurs in the print portion of the color ink. That may lead to a problem with small texts printed with the color ink, that is, the text cannot be distinguished or identified. Therefore, the surface tension $S_{CL}$ of the aqueous clear ink and the surface tension $S_C$ of the aqueous color ink satisfy the following relationship: $|S_{CL}-S_C| \leq 5$ mN/m.

The surface tension is preferably 35 mN/m or less and more preferably 32 mN/m or less at 25 degrees C. in terms that the ink is suitably leveled on a recording medium and the drying time of the ink is shortened.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)

25 degrees C.

Measuring time: three minutes.

pH of the ink is preferably from 7 to 12 and more preferably from 8 to 11 in terms of prevention of corrosion of metal material in contact with liquid.

Substrate

The substrate is not limited to articles used as a recording medium. For example, it is suitable to use building materials such as wall paper, floor material, and tiles, cloth for apparel such as T-shirts, textile, and leather. In addition, the configuration of the paths through which the recording medium is conveyed can be adjusted to use ceramics, glass, metal, etc., as the substrate.

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

For example, plastic films such as vinyl chloride resin film, polyethylene terephthalate (PET) film, acrylic resin film, polypropylene film, polyethylene film, and polycarbonate film are suitably used as the non-permeable substrate.

In the present disclosure, in the low gloss printing mode, using a substrate demonstrating a high gloss is preferable. Substrates demonstrating a high gloss easily emphasize matte effect by clear ink, which is preferable.

In the high gloss printing mode, using a substrate demonstrating a low gloss is preferable. Substrates demonstrating a low gloss easily emphasize gloss effect by clear ink, which is preferable.

Therefore, when the degree of gloss of the substrate to be used in the low gloss printing mode is Glow and the degree of gloss of the substrate to be used in the high gloss printing mode is Ghigh, the following relationship is satisfied: Glow>Ghigh, and preferably Glow−Ghigh≥100.

Method of Controlling Degree of Gloss of Print Image

The method of controlling gloss degree of a print image of the present disclosure includes applying an ink to a substrate to form a print image and heating the substrate, wherein the ink contains an aqueous clear ink containing a resin and water and an aqueous color ink containing a resin, a coloring material, and water, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink, wherein the method of controlling gloss of a print image has a low gloss printing mode in which low gloss is imparted and a high gloss printing mode in which high gloss is imparted, wherein the heating temperature is controlled high during printing in the low gloss printing mode in comparison with during printing in the high gloss printing mode and the heating temperature is controlled low during printing in the high gloss printing mode in comparison with during printing in the low gloss printing mode.

"the heating temperature is controlled high during printing in the low gloss printing mode in comparison with during printing in the high gloss printing mode" means that the absolute temperature (thermodynamic temperature) of a substrate to be heated by a heating device in the low gloss printing mode is higher than the absolute temperature (thermodynamic temperature) of the substrate to be hated by the heating device in the high gloss printing mode.

"the heating temperature is controlled low during printing in the high gloss printing mode in comparison with during printing in the low gloss printing mode" means that the absolute temperature (thermodynamic temperature) of a substrate to be heated by a heating device in the high gloss printing mode is lower than the absolute temperature (thermodynamic temperature) of the substrate to be heated by the heating device in the low gloss printing mode.

Printed Matter The printed matter of the present disclosure has a substrate and a printing layer on the substrate. The printing layer includes a clear ink layer containing a resin and the printed matter has a low gloss print image printed in the low gloss printing mode and a high gloss print image printed in the high gloss printing mode. In addition, the difference of the gloss degree between 60° gloss degree Ga of the print image printed in the high gloss printing mode and 60° gloss degree Gb of the substrate used in the high gloss printing mode, which is Ga−Gb, is 20 or more and the difference of the gloss degree between 60° gloss degree Gc of the print image printed in the low gloss printing mode and 60° gloss degree Gd of the substrate used in the low gloss printing mode, which is Gc−Gd, is −20 or less. Images are formed on a recording medium by the printing device and the printing method of the present disclosure to obtain the printed matter.

Recording Device and Recording Method

Hereinafter, an example in which black (K), cyan (C), magenta (M), and yellow (Y) are used in the description of the following recording device and the following recording method. It is possible to use the aqueous clear ink in place of or in addition to those inks.

The aqueous clear ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In addition, the inkjet printing device includes both a serial type device in which the discharging head is allowed to move and a line type device in which the liquid discharging head is not moved, unless otherwise specified.

Furthermore, in addition to the desktop type, this inkjet recording device includes a device capable of printing images on a wide recording medium and a continuous printer capable of using continuous paper rolled up in a roll-like form as a recording medium.

In the present disclosure, the recording device and the recording method respectively represent a device capable of discharging ink, various processing liquids, etc., to a recording medium and a method of recording utilizing such a device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
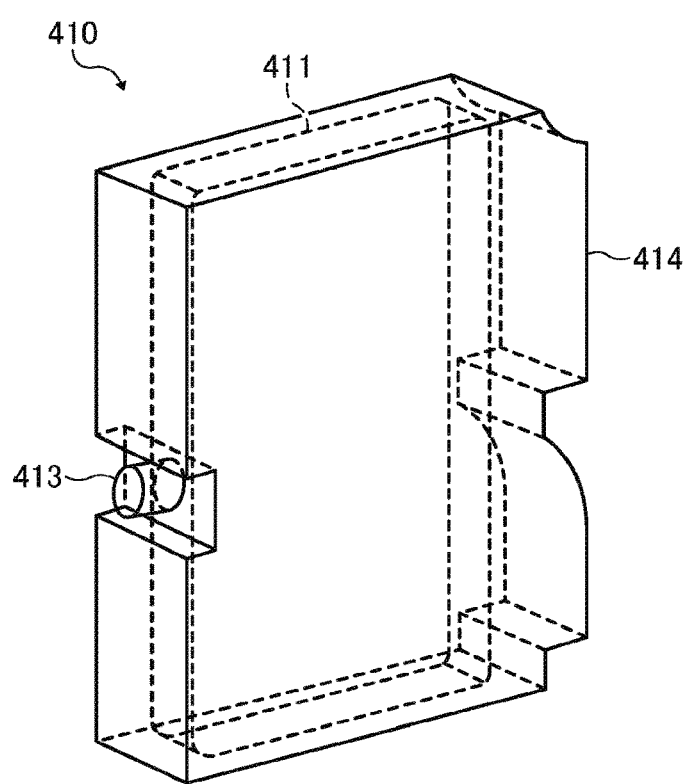
FIG. 2 is a diagram illustrating a perspective view of an example of the main tank of the image forming device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410$k$, 410$c$, 410$m$, and 410$y$) for each color of black (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also a device referred to as a pre-processing device, a post-processing device, etc.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

Figure 3:
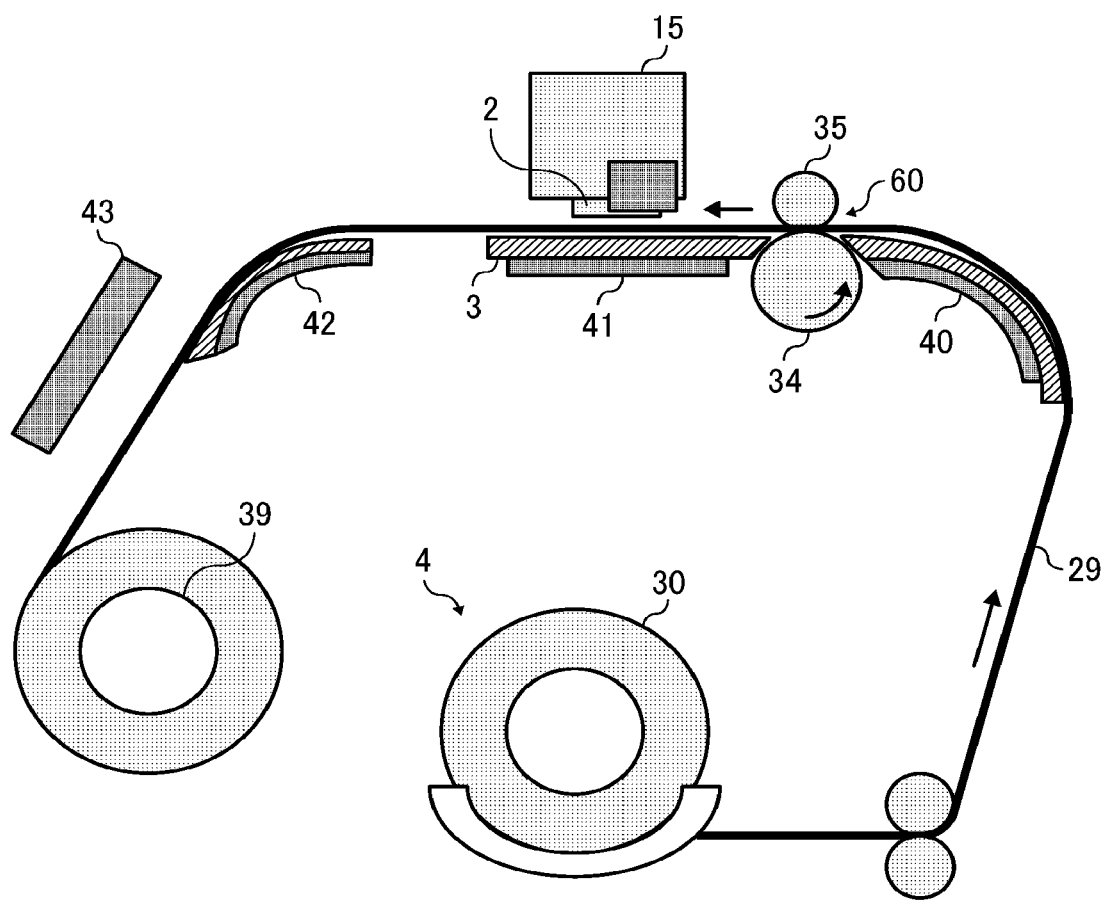
FIG. 3 is a diagram illustrating the inside of an inkjet printing device.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods. FIG. 3 is a diagram illustrating the inside of an inkjet printing device, which includes a recording head 2, a platen 3, a roll media storage unit 4, and heating devices, etc.

A carriage 15 carries the recording head 2 as a discharging device to discharge ink droplets that includes clear ink and other optional color inks such as black (K), yellow (Y), magenta (M), and cyan (C).

In addition, the roll medium accommodating unit 4 is a medium feeding device where a roll medium (recording medium) 30 as the substrate is set.

A conveying device 60 is formed of a conveying roller 34 and a pressing roller 35 which face each other while sandwiching the platen 3 from top and bottom.

While a recording medium (substrate) 29 is nipped between the conveying roller 34 and the pressing roller 35, the conveying roller 34 is rotated in the direction indicated by the arrow to convey forward the recording medium 29 conveyed onto the platen 3.

In addition, there are provided a pre-heater 40 that preliminarily heats the recording medium 29, which is disposed upstream of the platen 3 in the recording medium conveying direction and a print heater 41 as the heating device that conducts heating when the clear ink is discharged from the recording head and attached onto the substrate.

Further, a post heater 42 may be provided downstream of the recording head 2. Providing the post heater 42 is preferable because the recording medium 29 can be continuously heated and drying of the landed ink droplets can be promoted.

For the pre-heater 40, the print heater 41, and the post heater 42, conduction heating heaters using ceramic or nichrome wire, etc. are used.

Moreover, a hot air fun 43 is provided downstream of the starting point of the post heater 42 to blow hot air to the recording surface of the recording medium 29 on which the ink droplets have landed. Hot air is directly blown to the ink on the image-recorded surface by the hot air fun 43 so that the ink is completely dried. Thereafter the recording medium 29 is rolled up by a roll-up roller 39.

The usage of the ink is not particularly limited and can be suitably selected to suit to a particular application. For example, the ink can be used for printed matter, a paint, a coating material, and foundation. The ink can be used to form two-dimensional texts and images and furthermore a three-dimensional solid object (solid fabrication object or solid freeform fabrication object) as a material for 3D modeling.

An apparatus for fabricating a three-dimensional object can be any known device with no particular limit. For example, the apparatus includes an ink container, a supplying device, and a discharging device, a drier, etc. The solid fabrication object includes an object manufactured by repeated ink coating. In addition, the solid fabrication object includes a mold-processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc., in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Preparation Example 1

Preparation of Polycarbonate-based Polyurethane Resin Emulsion 1

1,500 parts of polycarbonate diol (reaction product of 1,6-hexane diol and dimethyl carbonate, number average molecular weight (Mn) of 1200), 220 parts of 2,2-dimethylol propionic acid (DMPA), and 1,347 parts of N-methyl pyrrolidone (NMP) were charged in a reaction container equipped with a stirrer, a reflux cooling tube, and a thermometer in a nitrogen atmosphere followed by heating to 60 degrees C. to dissolve DMPA.

Thereafter, 1,445 parts of 4,4'-dicyclohexyl methane diisocyanate and 2.6 parts of dibutyl tin dilaurylate (catalyst) were added thereto and the resultant was heated to 90 degrees C. to complete urethanation reaction in five hours. As a result, a urethane prepolymer having an isocyanate group at its distal end was obtained. This reaction mixture was cooled down to 80 degrees C. and 149 parts of triethyl amine was admixed therewith. 4,340 parts of the resultant mixture was extracted and charged in a liquid mixture of 5,400 parts of water and 15 parts of triethyl amine during vigorous stirring.

Thereafter, 1,500 parts of ice and 626 parts of 35 percent by mass 2-methyl-1,5-pentane diamine aqueous solution were added to conduct chain elongation reaction followed by distillation away of the solvent in such a manner that the solid portion concentration was 30 percent by mass to obtain polycarbonate-based polyurethane resin emulsion 1.

The thus-obtained polycarbonate-based-polyurethane resin emulsion 1 was measured by a film forming temperature test instrument (manufactured by Imoto Machinery Co., Ltd.).

The minimum film forming temperature was 55 degrees C.

Preparation Example 2

Preparation of Acrylic Resin Emulsion 1

900 parts of deionized water and 1 part of sodium lauryl sulfate were charged in a reaction container equipped with a stirrer, a reflux condenser, a dripping device, and a thermometer and heated to 70 degrees C. while replacing nitrogen during stirring. While keeping the temperature inside the reaction container at 70 degrees C., 4 parts of potassium persulfate was added as polymerization initiator and dissolved. An emulsified material, which was preliminarily prepared by adding 3 parts of lauryl sulfate sodium, 20 parts of acrylamide, 365 parts of styrene, 545 parts of butyl acrylate, and 10 parts of methacrrylic acid to 450 parts of deionized water during stirring, was continuously dripped to the reaction solution in four hours. After the dripping, the resultant was rested for three hours. After the thus-obtained aqueous emulsion was cooled down to room temperature, deionized water and sodium hydroxide aqueous solution were added to adjust pH of the solution to 8 to obtain an acrylic resin emulsion 1 (solid portion concentration of 30 percent by mass).

Manufacturing Example 1

Manufacturing of Aqueous Clear Ink A 25 percent by mass polyurethane resin emulsion 1 of Preparation Example 1 (solid portion concentration of 30 percent by mass), 20.2 percent by mass 1,2-propanediol, 11 percent by mass 1,3-propanediol, 3 percent by mass 1,2-butanediol, 2.8 percent by mass polysiloxane surfactant (KF-6017, manufactured by Shin-Etsu Chemical Co., Ltd.) as surfactant, and 38 percent by mass highly pure water were admixed and stirred to prepare a mixture.

Subsequently, the thus-obtained mixture was filtrated with a polypropylene filter (Betafine polypropylene pleat filter PPG series, manufactured by 3M company) with an average pore diameter of 0.2 micrometer to obtain aqueous clear ink A.

Manufacturing Examples 2 to 7

Manufacturing of Aqueous Clear Inks B to G

Aqueous clear inks B to G were manufactured in the same manner as in Manufacturing Example 1 except that the ink composition was changed as shown in Table 1.

TABLE 1

|  |  | Manufacturing Example 1 Aqueous clear ink A | Manufacturing Example 2 Aqueous clear ink B | Manufacturing Example 3 Aqueous clear ink C | Manufacturing Example 4 Aqueous clear ink D |
|---|---|---|---|---|---|
| Resin | Polyurethane resin emulsion (water dispersible, solid portion of 30 percent by mass) | 25 | 30 | 30 | 40 |
|  | Acrylic resin emulsion (water dispersible, solid portion of 30 percent by mass) | — | — | — | — |
| Pigment | Self-dispersible magenta pigment dispersion (water dispersible, pigment solid | — | — | — | — |

TABLE 1-continued

| | | | | | |
|---|---|---|---|---|---|
| | portion of 15 percent by mass) | | | | |
| Water | Highly pure water | 38 | 35.2 | 37.9 | 30.2 |
| Surfactant | Polysiloxane surfactant (KF-6017) | 2.8 | 2.8 | 1.8 | 1.8 |
| Organic solvent | 1,2-propanediol | 20.2 | 18 | 16.3 | 14 |
| | 1,3-propanediol | 11 | 11 | 11 | 11 |
| | 1,2-butanediol | 3 | 3 | 3 | 3 |
| Total (percent by mass) | | 100 | 100 | 100 | 100 |
| Solid resin portion in clear ink (percent by mass) | | 7.5 | 9 | 9 | 12 |
| Surface tension of ink (mN/m) | | 21.0 | 21.0 | 24.0 | 24.0 |

| | | | Manufacturing Example 5 Aqueous clear ink E | Manufacturing Example 6 Aqueous clear ink F | Manufacturing Example 7 Aqueous clear ink G |
|---|---|---|---|---|---|
| | Resin | Polyurethane resin emulsion (water dispersible, solid portion of 30 percent by mass) | — | 40 | 40 |
| | | Acrylic resin emulsion (water dispersible, solid portion of 30 percent by mass) | 40 | — | — |
| | Pigment | Self-dispersible magenta pigment dispersion (water dispersible, pigment solid portion of 15 percent by mass) | — | — | — |
| | Water | Highly pure water | 29.3 | 32.5 | 29.2 |
| | Surfactant | Polysiloxane surfactant (KF-6017) | 1.8 | 2.8 | 1 |
| | Organic solvent | 1,2-propanediol | 14.9 | 10.7 | 15.8 |
| | | 1,3-propanediol | 11 | 11 | 11 |
| | | 1,2-butanediol | 3 | 3 | 3 |
| Total (percent by mass) | | | 100 | 100 | 100 |
| Solid resin portion in clear ink (percent by mass) | | | 12 | 12 | 12 |
| Surface tension of ink (mN/m) | | | 24.0 | 21.0 | 25.5 |

Manufacturing Example 8

Manufacturing of Magenta Ink
Preparation of Self-Dispersible Magenta Pigment Dispersion After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a self-dispersible magenta pigment dispersion (pigment solid portion concentration: 15 percent by mass).

| | |
|---|---|
| Pigment Red 122 (Toner Magenta EO02, manufactured by Clariant (Japan) K.K.): | 15 parts |
| Anionic surfactant (Pionine A-51-B, manufactured by TAKEMOTO OIL & FAT Co., Ltd.): | 2 parts |
| Deionized water: | 83 parts |

Manufacturing of Magenta Ink 25 percent by mass polyurethane resin emulsion 1 of Preparation Example 1 (solid portion concentration of 30 percent by mass), self-dispersible magenta pigment dispersion (pigment solid portion concentration of 15 percent by mass), 20 percent by mass 1,2-propanediol, 11 percent by mass 1,3-propanediol, 3 percent by mass 1,2-butanediol, 2.8 percent by mass polysiloxane surfactant (KF-6017, manufactured by Shin-Etsu Chemical Co., Ltd.), and 18.2 percent by mass highly pure water were admixed and stirred to prepare a mixture.

Thereafter, the thus-obtained mixture was filtrated with a polypropylene filter (Betafine polypropylene pleat filter PPG series, manufactured by 3M company) with an average pore diameter of 0.2 μm to obtain a magenta ink.

Examples 9 and 10

Manufacture of Aqueous Magenta Inks B and C

Aqueous magenta inks B and C were manufactured in the same manner as in Manufacturing Example 8 except that the ink composition was changed as shown in Table 2.

TABLE 2

| | | Manufacturing Example 8 Magenta ink A | Manufacturing Example 9 Magenta ink B | Manufacturing Example 10 Magenta ink C |
|---|---|---|---|---|
| Resin | Polyurethane resin emulsion (water dispersible, solid portion of 30 percent by mass) | 25 | 25 | 25 |
| | Acrylic resin emulsion (water dispersible, solid portion of 30 percent by mass) | — | — | — |
| Pigment | Self-dispersible magenta pigment dispersion (water dispersible, pigment solid portion of 15 percent by mass) | 20 | 20 | 20 |
| Water | Highly pure water | 18.2 | 16.2 | 13.6 |
| Surfactant | Polysiloxane surfactant (KF-6017) | 2.8 | 1.8 | 0.4 |
| Organic solvent | 1,2-propanediol | 20 | 23 | 27 |
| | 1,3-propanediol | 11 | 11 | 11 |
| | 1,2-butanediol | 3 | 3 | 3 |
| | Total (percent by mass) | 100 | 100 | 100 |
| | Solid resin portion in clear ink (percent by mass) | 7.5 | 7.5 | 7.5 |
| | Surface tension of ink (mN/m) | 20.3 | 23.8 | 27.0 |

Example 1

Inkjet Printing

An ink cartridge of an inkjet printer (GXe5500 remodeled machine, manufactured by Ricoh Co., Ltd.) was filled with the aqueous clear ink A and aqueous magenta ink A of Manufacturing Example 1. Thereafter, the ink cartridge filled with the ink was mounted onto the inkjet printer GXe5500 remodeled machine followed by inkjet printing.

The inkjet printer GXe5500 remodeled machine was provided with heaters (temperature control controller, model MTCD, available from MISUMI, Inc.) in order that the recording medium could be heated from the back before printing, during printing, and after printing. This enabled printing on the recording medium heated by the heater before printing and during printing, and enabled the heater to heat and dry the printed matter after printing.

Printing was conducted while changing the type of recording media, heating conditions, and print images depending on the high gloss printing mode and the low gloss printing mode.

In the image printing, the magenta ink was printed as the first layer and the clear ink was printed as the second layer in such a manner that the clear ink print image was printed on the magenta ink print image and the two layers were simultaneously dried after the printing. Note that the two layers of magenta ink and clear ink were printed all at once.

Recording Medium

In the high gloss printing mode, synthetic paper VJFN160 (white polypropylene film, gloss degree of 16 (60° gloss value), manufactured by Yupo Corporation) was used as the recording medium 1.

In the low gloss printing mode, a window film GIY-0305 (transparent polyethylene terephthalate (PET) film, gloss degree of 159 (60° gloss value), manufactured by Lintec Corporation) was used as the recording medium 2.

Heating Condition

In the high gloss printing mode, the heating temperatures of each heater (heating device) disposed before printing, during printing, and after printing were set at 60 degrees C., 60 degrees C., and 70 degrees C., respectively. In the low gloss printing mode, the heating temperature of each heater (heating device) was set at 65 degrees C., 65 degrees C., and 70 degrees C. The temperature Thigh of the recording medium measured during printing was 59 degrees C. in the high gloss printing mode and the temperature Tlow of the recording medium measured during printing was 64 degrees C. in the low gloss printing mode.

The temperature of the recording medium during printing was measured with a digital radiation temperature sensor (FT-H10, manufactured by Keyence Corporation).

The temperature HT in Celcius of the heating device was based on the temperature of the heating device during printing.

Print Image

For the color ink print images, magenta single color solid image with an image resolution of 600 dpi×600 dpi and a print ratio of 100 percent and 9 point texts of magenta single color were printed in both of the high gloss printing mode and the low gloss printing mode.

As the clear ink print image, a solid image with an image resolution of 600 dpi×600 dpi with a print ratio of 100 percent was printed in the high gloss printing mode and a halftone image with an image resolution of 600 dpi×600 dpi with a print ratio of 40 percent was printed in the low gloss printing mode.

The clear ink image was printed smaller than the magenta print image. The portion in which 9 point magenta texts were printed was entirely covered with the clear ink image while the magenta solid image was partially covered with the clear ink image so that there were portions where only the magenta ink was printed.

Print Ratio

The print ratio means the following:

Print ratio(percent)=number of clear ink printing dots/(vertical resolution×horizontal resolution)×100

In the above formula, "the number of clear ink printing dots" means the number of dots actually printed with clear ink per unit area, and "vertical resolution" and "horizontal resolution" are resolutions per unit area. When clear ink is disposed at the same dot position in an overlapping manner for printing, "the number of clear ink printing dots" represents the total number of dots per unit area actually used for printing with clear ink.

In both the low gloss printing mode and the high gloss printing mode, the aqueous clear ink A was printed on the recording medium by single-overcoating directly on the same dot position in an overlapping manner.

The gloss degree of the thus-obtained printed matter was measured in the following manner. The results are shown in Table 3 to Table 5.

Gloss Degree

The two layer printed portion in which the aqueous clear ink A and the aqueous magenta ink A were printed and the portion where only the aqueous magenta ink was printed were separately measured. The results are shown in Table 3 to Table 5.

The gloss degree measuring instrument (micro-tri-gloss, manufactured by BYK Chemie Japan) was used. The 60° gloss value was determined as the gloss degree.

Distinguishing Lowercase

The 9-point texts of the color ink were evaluated based on the following evaluation criteria to determine whether the texts could be distinguished (identified). The results are shown in Table 3 to Table 5. The grades S, A, and B are allowable for practical use.

Evaluation Criteria

S: Text not thickened, with sharpness, clearly identifiable
A: Text slightly thickened, sufficiently distinguishable as text
B: Text thickened, distinguishable as text
C: Text crushed, unidentifiable

Example 2

Inkjet printing was conducted in the same manner as in Example 1 except that the image printed with clear ink in the high gloss printing mode was changed to a halftone image having an image resolution of 600 dpi×600 dpi with a print ratio of 80 percent and the image printed with clear ink in the low gloss printing mode was changed to a halftone image having an image resolution of 600 dpi×600 dpi with a print ratio of 70 percent.

The gloss degree of the thus-obtained printed matter was measured in the same manner as in Example 1.

Example 3

Inkjet printing was conducted in the same manner as in Example 1 except that the heating conditions were set at 50 degrees C., 50 degrees C., and 70 degrees C. for the heating temperatures of each of the heaters before printing, during printing, and after printing, respectively, in the high gloss printing mode and the heating conditions were set at 70 degrees C., 70 degrees C., and 70 degrees C. for the heating temperatures of each of the heaters before printing, during printing, and after printing, respectively, in the low gloss printing mode. The gloss degree of the thus-obtained printed matter was measured in the same manner as in Example 1.

The temperature Thigh of the recording medium measured during printing was 49 degrees C. in the high gloss printing mode and the temperature Tlow of the recording medium measured during printing was 68 degrees C. in the low gloss printing mode.

Example 4

Inkjet printing was conducted in the same manner as in Example 3 except that the aqueous clear ink A of Manufacturing Example 1 was changed to the aqueous clear ink B of Manufacturing Example 2.

The gloss degree of the thus-obtained printed matter was measured in the same manner as in Example 1.

Example 5

Inkjet printing was conducted in the same manner as in Example 3 except that the aqueous clear ink A of Manufacturing Example 1 was changed to the aqueous clear ink C of Manufacturing Example 3.

The gloss degree of the thus-obtained printed matter was measured in the same manner as in Example 1.

Example 6

Inkjet printing was conducted in the same manner as in Example 3 except that the aqueous clear ink A of Manufacturing Example 1 was changed to the aqueous clear ink D of Manufacturing Example 4.

The gloss degree of the thus-obtained printed matter was measured in the same manner as in Example 1.

Example 7

Inkjet printing was conducted in the same manner as in Example 3 except that the aqueous clear ink A of Manufacturing Example 1 was changed to the aqueous clear ink E of Manufacturing Example 5.

The gloss degree of the thus-obtained printed matter was measured in the same manner as in Example 1.

Example 8

Inkjet printing was conducted in the same manner as in Example 3 except that the aqueous clear ink A of Manufacturing Example 1 was changed to the aqueous clear ink F of Manufacturing Example 6.

The gloss degree of the thus-obtained printed matter was measured in the same manner as in Example 1.

Example 9

Inkjet printing was conducted in the same manner as in Example 3 except that the aqueous clear ink A of Manufacturing Example 1 was changed to the aqueous clear ink G of Manufacturing Example 7 and the aqueous magenta ink A of Manufacturing 8 was changed to the aqueous magenta ink B of Manufacturing Example 9.

The gloss degree of the thus-obtained printed matter was measured in the same manner as in Example 1.

Comparative Example 1

Inkjet printing was conducted in the same manner as in Example 2 except that the heater temperature in the high gloss printing mode was set at 65 degrees C., 65 degrees C., and 70 degrees C., which were the same as the heater temperature in the low gloss printing mode. The gloss degree of the thus-obtained printed matter was measured in the same manner as in Example 1.

The temperature Thigh of the recording medium measured during printing was 64 degrees C. in the high gloss printing mode and the temperature Tlow of the recording medium measured during printing was 64 degrees C. in the low gloss printing mode.

Comparative Example 2

Inkjet printing was conducted in the same manner as in Example 6 except that the aqueous magenta ink was changed from the magenta ink A of Manufacturing Example 8 to the magenta ink C.

The gloss degree of the thus-obtained printed matter was measured in the same manner as in Example 6.

Comparative Example 3

Inkjet printing was conducted in the same manner as in Example 6 except that the aqueous clear ink was changed from the clear ink D of Manufacturing Example 4 to the clear ink G.

The gloss degree of the thus-obtained printed matter was measured in the same manner as in Example 6.

TABLE 3

| | | Printing condition | | | | |
|---|---|---|---|---|---|---|
| | | | Color Ink | | Clear ink | |
| | | Printing mode | Ink type | Surface tension $S_c$ (mN/m) | Ink type | Surface tension $S_{cL}$ (mN/m) | $|S_{CL} - S_C|$ (mN/m) |
| Example | 1 | High gloss mode Low gloss mode | Magenta ink A | 20.3 | Clear ink A | 21.0 | 0.7 |
| | 2 | High gloss mode Lo wgloss mode | Magenta ink A | 20.3 | Clear ink A | 21.0 | 0.7 |

TABLE 3-continued

| | | | | | | | |
|---|---|---|---|---|---|---|---|
| 3 | High gloss mode Low gloss mode | Magenta ink A | 20.3 | Clear ink A | 21.0 | 0.7 | |
| 4 | High gloss mode Low gloss mode | Magenta ink A | 20.3 | Clear ink B | 21.0 | 0.7 | |
| 5 | High gloss mode Low gloss mode | Magenta ink A | 20.3 | Clear ink C | 24.0 | 3.7 | |
| 6 | High gloss mode Low gloss mode | Magenta ink A | 20.3 | Clear ink D | 24.0 | 3.7 | |
| 7 | High gloss mode Low gloss mode | Magenta ink A | 20.3 | Clear ink E | 24.0 | 3.7 | |
| 8 | High gloss mode Low gloss mode | Magenta ink A | 20.3 | Clear ink F | 21.0 | 0.7 | |
| 9 | High gloss mode Low gloss mode | Magenta ink B | 23.8 | Clear ink G | 21.0 | 2.8 | |

| | | | Printing condition | | | |
|---|---|---|---|---|---|---|
| | | | | | Heater temperature (degrees C.) | |
| | | | Clear ink | | | |
| | | Recording medium | print image (print ratio) | Before printing | In printing HT | After printing |
| Example | 1 | Synthesized paper VJFN160 (white polypropylene) | Solid image (100 percent) | 60 degrees C. | 60 degrees C. | 70 degrees C. |
| | | Window film GIY0305 (transparent PET) | Halftone image (40 percent) | 65 degrees C. | 65 degrees C. | 70 degrees C. |
| | 2 | Synthesized paper VJFN160 (white polypropylene) | Halftone image (80 percent) | 60 degrees C. | 60 degrees C. | 70 degrees C. |
| | | Window film GIY0305 (transparent PET) | Halftone image (70 percent) | 65 degrees C. | 65 degrees C. | 70 degrees C. |
| | 3 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |
| | 4 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |
| | 5 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |
| | 6 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |
| | 7 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |
| | 8 | Synthesized paper VJFN160 (white polypropylene) | Solid image (100 percent) | 50 degrees C. | 50 degrees C. | 70 degrees C. |
| | | Window film GIY0305 (transparent PET) | Halftone image (40 percent) | 70 degrees C. | 70 degrees C. | 70 degrees C. |

TABLE 3-continued

| | | | | | |
|---|---|---|---|---|---|
| 9 | Synthesized paper VJFN160 (white polypropylene) | Solid image (100 percent) | 50 degrees C. | 50 degrees C. | 70 degrees C. |
| | Window film GIY0305 (transparent PET) | Halftone image (40 percent) | 70 degrees C. | 70 degrees C. | 70 degrees C. |

TABLE 4

| | | Printing condition | | | | |
|---|---|---|---|---|---|---|
| | | | Color Ink | | Clear ink | |
| | | Printing mode | Ink type | Surface tension $S_c$ (mN/m) | Ink type | Surface tension $S_{cL}$ (mN/m) | $|S_{CL} - S_C|$ (mN/m) |
| Comparative Example | 1 | High gloss mode Low gloss mode | Magenta ink A | 20.3 | Clear ink A | 21.0 | 0.7 |
| | 2 | High gloss mode Low gloss mode | Magenta ink C | 27.0 | Clear ink D | 21.0 | 6.0 |
| | 3 | High gloss mode Low gloss mode | Magenta ink A | 20.3 | Clear ink G | 25.5 | 5.2 |

| | | | Printing condition | | | |
|---|---|---|---|---|---|---|
| | | | | Clear ink | Heater temperature (degrees C.) | | |
| | | Recording medium | print image (print ratio) | Before printing | HT in printing | After printing |
| Comparative Example | 1 | Synthesized paper VJFN160 (white polypropylene) | Halftone image (80 percent) | 65 degrees C. | 65 degrees C. | 70 degrees C. |
| | | Window film GIY0305 (transparent PET) | Halftone image (70 percent) | 65 degrees C. | 65 degrees C. | 70 degrees C. |
| | 2 | Synthesized paper VJFN160 (white polypropylene) | Halftone image (80 percent) | 50 degrees C. | 50 degrees C. | 70 degrees C. |
| | | Window film GIY0305 (transparent PET) | Halftone image (70 percent) | 70 degrees C. | 70 degrees C. | 70 degrees C. |
| | 3 | Synthesized paper VJFN160 (white polypropylene) | Halftone image (80 percent) | 50 degrees C. | 50 degrees C. | 70 degrees C. |
| | | Window film GIY0305 (transparent PET) | Halftone image (70 percent) | 70 degrees C. | 70 degrees C. | 70 degrees C. |

TABLE 5

| | | | Evaluation result | | | |
|---|---|---|---|---|---|---|
| | | | Gloss degree measuring result | | Difference of gloss degree | Text |
| | | Temperature of recording medium during printing | (Color ink + clear ink) two-layer printing portion | Printed portion with color ink only | (gloss degree of clear ink printed portion) − (gloss degree of clear ink unprinted portion) | bleeding evaluation (lowercase distinction) |
| Example | 1 | $T_{High}$ 59 degrees C. | 62 | 27 | 35 | S |
| | | $T_{Low}$ 64 degrees C. | 82 | 114 | −32 | S |
| | 2 | $T_{High}$ 59 degrees C. | 46 | 21 | 25 | S |
| | | $T_{Low}$ 64 degrees C. | 86 | 113 | −27 | S |

TABLE 5-continued

| | | | Evaluation result | | | |
|---|---|---|---|---|---|---|
| | | | | Gloss degree measuring result | | Difference of gloss degree | Text |
| | | | Temperature of recording medium during printing | (Color ink + clear ink) two-layer printing portion | Printed portion with color ink only | (gloss degree of clear ink printed portion) − (gloss degree of clear ink unprinted portion) | bleeding evaluation (lowercase distinction) |
| | 3 | $T_{High}$ | 49 degrees C. | 75 | 32 | 43 | S |
| | | $T_{Low}$ | 68 degrees C. | 71 | 111 | −40 | S |
| | 4 | $T_{High}$ | 49 degrees C. | 80 | 32 | 48 | S |
| | | $T_{Low}$ | 68 degrees C. | 67 | 111 | −44 | S |
| | 5 | $T_{High}$ | 49 degrees C. | 78 | 32 | 46 | A |
| | | $T_{Low}$ | 68 degrees C. | 62 | 111 | −49 | S |
| | 6 | $T_{High}$ | 49 degrees C. | 85 | 32 | 53 | A |
| | | $T_{Low}$ | 68 degrees C. | 53 | 111 | −58 | S |
| | 7 | $T_{High}$ | 49 degrees C. | 86 | 32 | 54 | A |
| | | $T_{Low}$ | 68 degrees C. | 56 | 111 | −55 | S |
| | 8 | $T_{High}$ | 49 degrees C. | 87 | 32 | 55 | S |
| | | $T_{Low}$ | 68 degrees C. | 57 | 111 | −54 | S |
| | 9 | $T_{High}$ | 49 degrees C. | 85 | 30 | 55 | A |
| | | $T_{Low}$ | 68 degrees C. | 52 | 108 | −56 | S |
| Comparative Example | 1 | $T_{High}$ | 64 degrees C. | 38 | 26 | 12 | S |
| | | $T_{Low}$ | 64 degrees C. | 98 | 114 | −16 | S |
| | 2 | $T_{High}$ | 49 degrees C. | 83 | 27 | 56 | C |
| | | $T_{Low}$ | 68 degrees C. | 51 | 106 | −55 | A |
| | 3 | $T_{High}$ | 49 degrees C. | 81 | 32 | 49 | C |
| | | $T_{Low}$ | 68 degrees C. | 50 | 111 | −61 | A |

As seen in the results shown in Tables 3 to 5 with a particular focus on the results of the gloss degree difference between the two-layer printed portion of the color ink and the printed portion with only the color ink, the gloss in Examples 1 to 9 satisfying the relationships: HTlow>HThigh and Tlow>Thigh significantly decreased in the low gloss printing mode and significantly increased in the high gloss mode in comparison with the gloss in Comparative Example 1 satisfying the relationships: HTlow=HThigh and Tlow=Thigh.

Also, when Example 1 and Example 2 are compared, a large gloss change occurred in Example 1, in which Dhigh−Dlow was 60 percent, in comparison with Example 2, in which Dhigh−Dlow was 10 percent.

Moreover, as seen in the results of Example 3, Example 4, and Example 6, as the resin proportion in the aqueous clear ink increases, the gloss change in the clear ink printing becomes large, so that Examples 4 and 6, in which the resin proportion in the aqueous clear ink was 8 percent by mass or more demonstrated a larger gloss change than Example 3, in which the resin proportion in the aqueous clear ink was less than 8 percent by mass.

Moreover, as seen in the results of Example 4 and Example 5, a large gloss change occurred in the low gloss printing mode in Example 5, in which the proportion of the surfactant was 2 percent by mass or less in comparison with Example 4, in which the proportion of the surfactant surpassed 2 percent by mass.

Furthermore, when Example 6 and Comparative Example 2 are compared, although the clear ink is evaluated with the same ink, in Comparative Example 2, the difference in the surface tension between the color ink (magenta ink) and the clear ink was 6 mN/m, which was significantly larger than the surface tension in Example 6, so that the evaluation on text bleeding was poor in Comparative Example 2.

Further, when Example 6 and Comparative Example 3 are compared, in which the evaluation was made for the same magenta ink. In Comparative Example 3, the difference in the surface tension between the color ink (magenta ink) and the clear ink was 5.2 mN/m. The difference in the surface tension is larger than that in Example 6 so that the evaluation on text bleeding was poor in Comparative Example 3.

Aspects of the present disclosure are, for example, as follows.

1. A printing device includes an ink container, an ink accommodated in the ink container, the ink containing at least an aqueous clear ink containing a resin and water and an aqueous color ink containing a resin, a coloring material, and water and a heating device configured to heat a substrate, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink, wherein the printing device has a low gloss printing mode in which low gloss is imparted and a high gloss printing mode in which high gloss is imparted, wherein the heating device heats the substrate while satisfying the following relationship, Tlow>Thigh, where Tlow represents the temperature in Celcius of the substrate in a low gloss printing region in which the aqueous clear ink is printed in the low printing mode and Thigh represents the temperature in Celcius of the substrate in a high gloss printing region in which the aqueous clear ink is printed in the high printing mode.

2. The inkjet printing method according to 1 mentioned above, wherein the following relationship is satisfied: Tlow−Thigh≥10 degrees C.

3. A printing device includes an ink container, an ink accommodated in the ink container, the ink containing at least an aqueous clear ink containing a resin and water and an aqueous color ink containing a resin, a coloring material, and water and a heating device configured to heat a substrate, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink, wherein the printing device has a low gloss printing mode in which low gloss is imparted and a high gloss printing mode in which high gloss is imparted, wherein the following relationship is satisfied, wherein the following relationship is satisfied, HTlow>HThigh, where HTlow represents the temperature in Celcius of the heating device in the low gloss printing mode and HThigh represents the temperature in Celcius of the heating device in the high gloss printing mode.

4. The printing device according to 3 mentioned above, wherein the following relationship is satisfied: HTlow−HThigh≥10 degrees C.

5. The printing device according to any one of 1 to 4 mentioned above, wherein the following relationship is satisfied: Glow>Ghigh, where Glow represents the gloss degree of the substrate for use in the low gloss printing mode and Ghigh represents the gloss degree of the substrate for use in the high gloss printing mode.

6. The printing device according to any one of 1 to 5 mentioned above, wherein the proportion of the resin in the aqueous clear ink is 8 percent by mass or more.

7. The printing device according to any one of 1 to 6 mentioned above, wherein the resin contains a polyurethane resin.

8. The printing device according to any one of 1 to 7 mentioned above, wherein the aqueous clear ink further contains a surfactant and the proportion of the surfactant is 2 percent by mass or less.

9. An inkjet printing device includes the printing device of any one of 1 to 8 mentioned above including a discharging head configured to discharge an ink.

10. A printing method includes applying an ink to a substrate and heating the substrate, wherein the ink contains at least an aqueous clear ink containing a resin and water and an aqueous color ink containing a resin, a coloring material, and water, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink, wherein the printing method has a low gloss printing mode in which low gloss is imparted and a high gloss printing mode in which high gloss is imparted, wherein, in the heating, the following relationship is satisfied, Tlow>Thigh, where Tlow represents the temperature in Celcius of the substrate in a low gloss printing region in which the aqueous clear ink is printed in the low printing mode and Thigh represents the temperature in Celcius of the substrate in a high gloss printing region in which the aqueous clear ink is printed in the high printing mode.

11. The printing method according to 10 mentioned above, wherein, in the printing, the following relationship is satisfied: Tlow−Thigh≥10 degrees C.

12. A printing method includes applying an ink to a substrate and heating the substrate, wherein the ink contains at least an aqueous clear ink containing a resin and water and an aqueous color ink containing a resin, a coloring material, and water, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink, wherein the printing method has a low gloss printing mode in which low gloss is imparted and a high gloss printing mode in which high gloss is imparted, wherein the following relationship is satisfied, HTlow>HThigh, where HTlow represents the temperature in Celcius of the heating device in the low gloss printing mode and HThigh represents the temperature in Celcius of the heating device in the high gloss printing mode.

13. The printing method according to 12 mentioned above, wherein the following relationship is satisfied: HTlow−HThigh≥10 degrees C.

14. The printing method according to any one of 10 to 13 mentioned above, wherein the following relationship is satisfied: Glow>Ghigh, where Glow represents the gloss degree of the substrate for use in the low gloss printing mode and Ghigh represents the gloss degree of the substrate for use in the high gloss printing mode.

15. The printing method according to any one of 10 to 14 mentioned above, wherein the proportion of the resin in the aqueous clear ink is 8 percent by mass or more.

16. The printing method according to any one of 10 to 15 mentioned above, wherein the resin contains a polyurethane resin.

17. The printing method according to any one of 10 to 16 mentioned above, wherein the aqueous clear ink further contains a surfactant and the proportion of the surfactant in the aqueous clear ink is 2 percent by mass or less.

18. A method of controlling gloss degree of a print image formed by applying an ink to a substrate to form the print image and heating the substrate, wherein the print image is formed in a low gloss printing mode in which low gloss is imparted or a high gloss printing mode in which high gloss is imparted, includes controlling the heating temperature high during printing in the low gloss printing mode in comparison with during printing in the high gloss printing mode and controlling the heating temperature low during printing in the high gloss printing mode in comparison with during printing in the low gloss printing mode, wherein the ink contains an aqueous clear ink containing a resin and water and an aqueous color ink containing a resin, a coloring material, and water, wherein the following relationship is satisfied, $|S_{CL}-S_C|\leq 5$ mN/m, where $S_{CL}$ represents the surface tension of the aqueous clear ink and $S_C$ represents the surface tension of the aqueous color ink.

19. Printed matter includes a substrate and a printing layer on the substrate, wherein the printing layer includes a clear ink layer containing a resin and the printed matter has a low gloss print image printed in a low gloss printing mode and a high gloss print image printed in a high gloss printing mode, wherein the difference between 60° gloss degree Ga of the print image printed in the high gloss printing mode and 60° gloss degree Gb of the substrate used in the high gloss printing mode, which is Ga−Gb, is 20 or more and the difference between 60° gloss degree Gc of the print image printed in the low gloss printing mode and 60° gloss degree Gd of the substrate used in the low gloss printing mode, which is Gc−Gd, is −20 or less.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A printing device comprising:
    an ink container;
    an ink accommodated in the ink container, the ink containing an aqueous clear ink containing a resin and water and an aqueous color ink containing a resin, a coloring material, and water; and
    a heating device configured to heat a substrate,
    wherein the following relationship is satisfied, $|S_{CL}-S_C|\leq 5$ mN/m, where $S_{CL}$ represents a surface tension of the aqueous clear ink and $S_C$ represents a surface tension of the aqueous color ink,
    wherein the printing device has a low gloss printing mode in which low gloss is imparted and a high gloss printing mode in which high gloss is imparted,
    wherein the heating device heats the substrate while satisfying the following relationship: Tlow>Thigh, where Tlow represents a temperature in Celcius of the substrate in a low gloss printing region in which the aqueous clear ink is printed in the low printing mode and Thigh represents a temperature in Celcius of the substrate in a high gloss printing region in which the aqueous clear ink is printed in the high printing mode.

2. The printing device according to claim 1, wherein the following relationship is satisfied: Tlow−Thigh≥10 degrees C.

3. The printing device according to claim 1, wherein the following relationship is satisfied: Glow>Ghigh, where Glow represents a gloss degree of the substrate for use in the low gloss printing mode and Ghigh represents a gloss degree of the substrate for use in the high gloss printing mode.

4. The printing device according to claim 1, wherein a proportion of the resin in the aqueous clear ink is 8 percent by mass or more.

5. The printing device according to claim 1, wherein the resin comprises a polyurethane resin.

6. The printing device according to claim 1, wherein the aqueous clear ink further contains a surfactant and a proportion of the surfactant in the aqueous clear ink is 2 percent by mass or less.

7. A printing device comprising:
    an ink container;
    an ink accommodated in the ink container, the ink containing an aqueous clear ink containing a resin and water and an aqueous color ink containing a resin, a coloring material, and water; and
    a heating device configured to heat a substrate,
    wherein the following relationship is satisfied, $|S_{CL}-S_C|\leq 5$ mN/m, where $S_{CL}$ represents a surface tension of the aqueous clear ink and $S_C$ represents a surface tension of the aqueous color ink,
    wherein the printing device has a low gloss printing mode in which low gloss is imparted and a high gloss printing mode in which high gloss is imparted,
    wherein the following relationship is satisfied, HTlow>HThigh, where HTlow represents a temperature in Celcius of the heating device in the low gloss printing mode and HThigh represents a temperature in Celcius of the heating device in the high gloss printing mode.

8. The printing device according to claim 7, wherein the following relationship is satisfied: HTlow−HThigh≥10 degrees C.

9. The printing device according to claim 7, wherein the following relationship is satisfied: Glow>Ghigh, where Glow represents a gloss degree of the substrate for use in the low gloss printing mode and Ghigh represents a gloss degree of the substrate for use in the high gloss printing mode.

10. The printing device according to claim 7, wherein a proportion of the resin in the aqueous clear ink is 8 percent by mass or more.

11. The printing device according to claim 7, wherein the resin comprises a polyurethane resin.

12. The printing device according to claim 7, wherein the aqueous clear ink further contains a surfactant and a proportion of the surfactant in the aqueous clear ink is 2 percent by mass or less.

13. A printing method comprising:
    applying an ink to a substrate; and
    heating the substrate,
    wherein the ink contains an aqueous clear ink containing a resin and water and an aqueous color ink containing a resin, a coloring material, and water,
    wherein the following relationship is satisfied, $|S_{CL}-S_C|\leq 5$ mN/m, where $S_{CL}$ represents a surface tension of the aqueous clear ink and $S_C$ represents a surface tension of the aqueous color ink,
    wherein the printing method has a low gloss printing mode in which low gloss is imparted and a high gloss printing mode in which high gloss is imparted,
    wherein, in the heating, the following relationship is satisfied, Tlow>Thigh, where Tlow represents a temperature in Celcius of the substrate in a low gloss printing region in which the aqueous clear ink is printed in the low printing mode and Thigh represents a temperature in Celcius of the substrate in a high gloss printing region in which the aqueous clear ink is printed in the high printing mode.

* * * * *